United States Patent
Smith et al.

(10) Patent No.: US 7,192,988 B2
(45) Date of Patent: Mar. 20, 2007

(54) PROCESS FOR RECYCLING POLYESTER MATERIALS

(75) Inventors: Brad Lee Smith, Wilmington, NC (US); Pravin Nayar, New Delhi (IN); Gordon Shaw, Charlotte, NC (US)

(73) Assignee: Invista North America S.AR.L., Wilmington, DE (US)

( * ) Notice: Subject to any disclaimer, the term of this patent is extended or adjusted under 35 U.S.C. 154(b) by 254 days.

(21) Appl. No.: 10/955,297

(22) Filed: Sep. 30, 2004

(65) Prior Publication Data

US 2006/0074136 A1    Apr. 6, 2006

(51) Int. Cl.
*C08J 11/24*     (2006.01)
*C08J 11/16*     (2006.01)

(52) U.S. Cl. ....................... 521/48.5; 521/48
(58) Field of Classification Search .................. 521/48, 521/48.5

See application file for complete search history.

(56) References Cited

U.S. PATENT DOCUMENTS

| | | | |
|---|---|---|---|
| 5,504,121 A | 4/1996 | West | |
| 5,602,187 A | 2/1997 | West | |
| 5,635,584 A | 6/1997 | Ekart et al. | |
| 5,869,543 A | 2/1999 | Boos et al. | |
| 6,630,601 B1 | 10/2003 | Inada et al. | |
| 6,642,350 B1 | 11/2003 | Asakawa et al. | |

*Primary Examiner*—Tae H Yoon

(57) ABSTRACT

The present invention is a process for recycling colored polyester. More specifically, colored polyester for recycling is depolymerized by the addition of glycol to form the monomer BHET. The BHET is contacted with activated carbon to remove some colorant. The remaining colorant is extracted with water, alcohol, or glycol to produce white, purified BHET. The white, purified BHET is separated from the extraction solvent (water, alcohol, or glycol) by filtering, decanting, or centrifuging, for example. The purified BHET monomer can be polymerized to polyethylene terephthalate meeting food contact specifications, using known polymerization processes.

13 Claims, 3 Drawing Sheets

PROCESS FOR RECYCLING POLYESTER MATERIALS

BACKGROUND OF THE INVENTION

1) Field of the Invention

The present invention relates to a process for recycling polyester materials. Specifically it relates to the purification of crude bis hydroxyethyl terephthalate (BHET) from colored polyester (post consumer/scrap production) waste streams. More specifically, colored polyester for recycling is depolymerized by the addition of glycol to form the monomer—BHET. The BHET is contacted with activated carbon to remove some colorant. The remaining colorant is extracted with water, alcohol, or glycol to produce white, purified BHET. The purified BHET is polymerized to polyethylene terephthalate meeting food contact specifications.

2) Prior Art

Typically waste polyester has uses in areas where color is not a factor, for example, as textile insulation, furniture padding, fiber fill, carpet fibers, etc., which enable the user to recycle any color or mixture of colors of waste polyester, and apply pigments or dyes to mask any undesirable color. In this production process, the waste polyester is merely re-extruded as molten polyester, optionally using a vented extruder to remove moisture, and filtered to remove bits of metal, paper, etc. The pigment or dye may then be added and the polyester extruded as fiber or film, for example. These applications generally use 100% waste polyester.

Additionally another method of treatment of waste polyester of the quality described above is to pelletize the waste, through grinding, cutting or other means to produce a low density 'flock' particle, similar in shape to a polymer melt chip, a more easily handled form of the waste polyester, which can then be fed by a conventional mass flow device directly into a reaction vessel which is part of a process for making PET polymer, either in a batch mode or a continuous mode, and then adjusting the color of the final product by the addition of pigments or dyes as described above before final extrusion to fiber or chip or film, for example. Waste polyester can be from any source, such as post-consumer articles like beverage bottles, or from scrap production of polyester, either as fiber waste, polymer waste or solid waste.

It is also known to recycle waste post consumer product polyester in packaging applications, such as for beverages. These processes generally use methanolysis, hydrolysis, or glycolysis reactions to depolymerize the waste polyester to the monomer and then purify and use this monomer as the feedstock for polymerization with virgin raw materials, for example.

In a methanolysis polyethylene terephthalate (PET) process, waste PET is reacted with methanol to produce dimethyl terephthalate (DMT) and ethylene glycol (EG). These reaction products may be readily purified and used thereafter to produce virgin polyester (polyester formed from its raw materials).

Hydrolysis of PET is reacting waste PET with water to depolymerize into terephthalic acid (TA) and EG. However, it is known that certain types of contaminants generally present in waste PET are very difficult and expensive to remove from TA.

Glycolysis of PET is reacting waste PET with glycol such as EG thus producing the monomer, bis hydroxyethyl terephthalate (BHET) and other oligomers. This process has significant advantages over methanolysis or hydrolysis primarily because the BHET may be used as a raw material in either a DMT or TA polyester production process without significant major modification of the production facility.

These chemical depolymerization processes, methanolysis, hydrolysis, or glycolysis require the addition of other materials to the waste polyester, i.e., methanol, water, or glycol respectively, followed by a purification step. The total manufacturing costs of these recycle processes exceed that of manufacturing virgin PET resin.

U.S. Pat. No. 5,635,584 to Ekart et al. discloses a process whereby post consumer polyester is purified using glycolysis to depolymerize the previously used polyester materials, dissolving the depolymerized materials in a hot solvent, purification of the solution containing the depolymerized materials, and subsequent precipitation of the depolymerized materials for reuse as raw material (for polyester packaging materials). This process requires the use of a hot solvent, such as n-butyl alcohol to purify the raw materials.

U.S. Pat. No. 5,869,543 to Boos et al. discloses a method for synthesizing polyethylene terephthalate from waste polyethylene terephthalate by cleavage with ethylene glycol and separation of BHET from the cleavage mixture with a specific temperature program, recrystallization from water, and esterification and polycondensation with the addition of terephthalic acid.

U.S. Pat. Nos. 5,504,121 and 5,602,187 to West disclose a process for removing contaminants from colored PET components by depolymerizing polyethylene terephthalate by reacting ethylene glycol with the material for a predetermined period of time to form a solution containing soluble short chain PET polymers and/or BHET; contacting the short chain PET polymers and/or BHET with activated carbon to remove dye; recovering short chain PET polymers and/or BHET and ethylene glycol; and hydrolyzing the recovered short chain PET polymers and/or BHET at elevated pressure and temperature for a predetermined period of time to form an ethylene glycol solution and crystals of terephthalic acid. The hydrolyzed short chain PET polymers and/or BHET may then be further treated with activated carbon to remove dye and purify the short chain PET polymers and/or BHET.

U.S. Pat. No. 6,642,350 to Asakawa et al. and U.S. Pat. No. 6,630,601 to Inada et al. disclose a process in which crude BHET is passed through a bed of activated carbon followed by an ion-exchange bed.

These prior art processes are either not economic or fail to purify the post consumer PET, especially colored PET, to a sufficient purity and color so that it can be used as the raw material at a reasonable, greater than about 10%, rate in a virgin PET process.

SUMMARY OF THE INVENTION

The present invention is a process for recycling colored polyester. More specifically, colored polyester for recycling is depolymerized by the addition of glycol to form the monomer BHET. The BHET is contacted with activated carbon to remove some colorant. The remaining colorant is extracted with water, alcohol, or glycol to produce white, purified BHET. The white, purified BHET is separated from the extraction solvent (water, alcohol, or glycol) by filtering, decanting, or centrifuging, for example. The purified BHET monomer is polymerized to polyethylene terephthalate meeting food contact specifications, using known polymerization processes.

In the broadest sense, the present invention is a process for recycling colored polyester thus producing purified, white, polyester suitable for food grade uses.

In the broadest sense the present invention is a method of removing colorants from polyester for recycle comprising:
a) depolymerizing polyester by adding glycol to said polyester to produce a glycolyzed monomer;
b) optionally filtering contaminants from said glycolyzed monomer
c) contacting said glycolyzed monomer with activated carbon to remove some colorant;
d) extracting the remaining colorant by adding water, methanol, or glycol to said glycolyzed monomer; and
e) separating said glycolyzed monomer from said water, methanol, or glycol with said remaining colorant thereby producing white glycolyzed monomer.

BRIEF DESCRIPTION OF THE DRAWINGS

The process of the present invention is more easily understood by referring to the figures.

DESCRIPTION OF THE PREFERRED EMBODIMENTS

Figure 1:
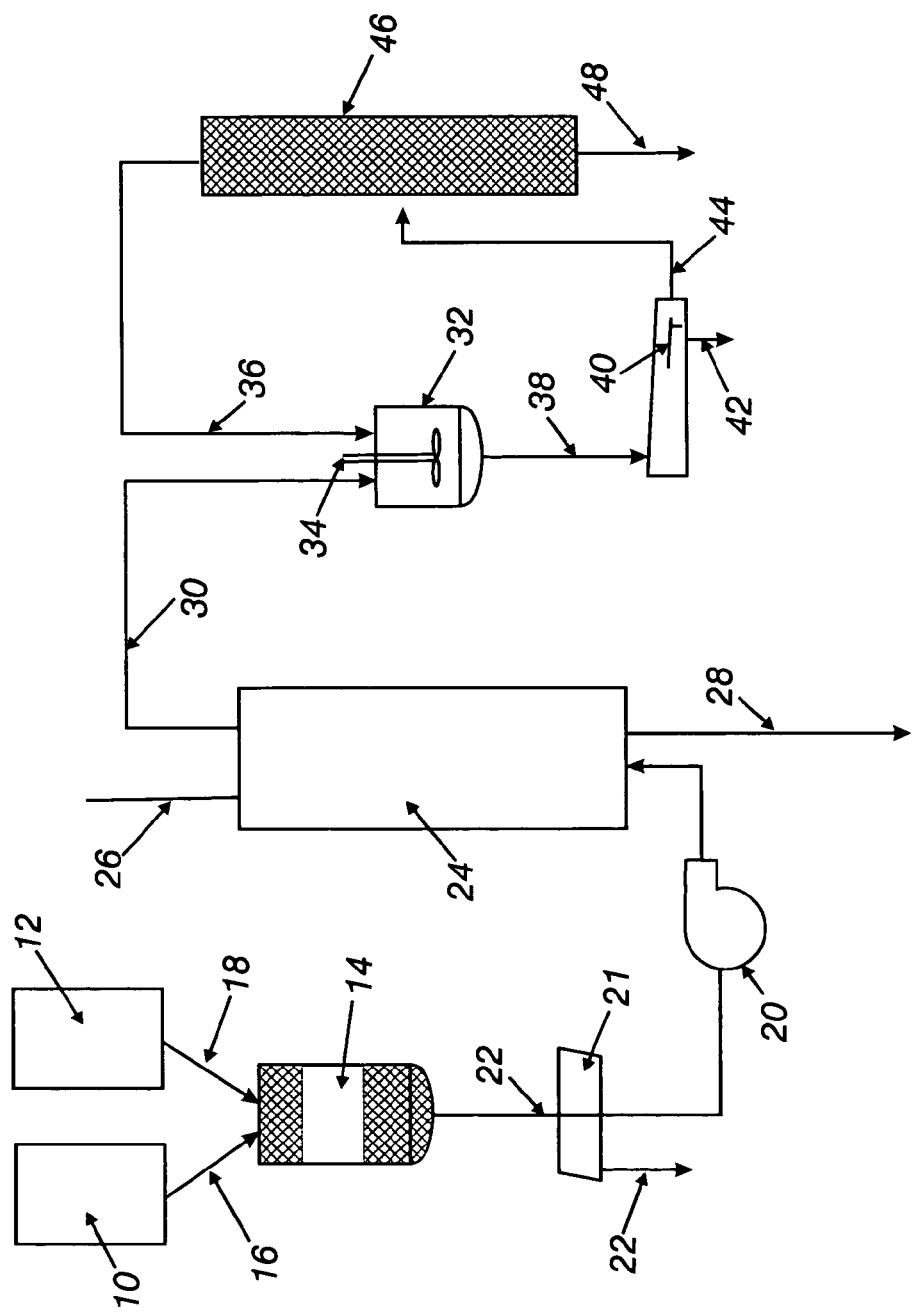
FIG. 1 illustrates the process design of the operation of the present invention.

Colored polyester suitable for use in the present invention may be any source such as post-consumer articles like bottles, containers, film, etc., or from scrap generated during the production of polyester, or generated from the production of articles such as bottles, film, etc. Post-consumer bottles and scrap from production of polyester or from the production of post-consumer bottles is preferred because these sources of polyester are relatively pure. Although any color of polyester may be employed, the color of the largest component in commercially available post-consumer bottles is green followed by brown bottles. These colored polyesters can be treated, according to the present invention, to remove all the color such that the polyester is pure, clear, and suitable for food-grade uses (such as soft drink bottles).

Typically, post-consumer baled plastic bottles are processed by bale opening, and color sorting followed by granulation. This dirty regrind (from granulation) passes through a series of sorting and cleaning stages to separate PET from most of the other materials. The washed stream of colored flake is used as the feedstock of the current invention.

To depolymerize the colored polyester for recycle purposes, the ratio of glycol to polyester, on a weight basis, is from about 0.5 to 1, to 2 to 1 or higher. While there may not be an upper limit on the amount of glycol one can employ with the present invention, there is an economic barrier in which employing more than about three parts by weight of glycol to one part by weight of colored polyester causes the process to be more expensive and provides no additional purity or clarity benefit. The glycolysis depolymerization is completed in a reactor at a temperature range of from about 180° C. when the process uses a high ratio of EG to polyester and the pressure of the reaction is atmospheric, to a temperature range of about 280° C. when the ratio of EG is lower and the reaction is performed at superatmospheric pressure, for a period of about one to five hours in either case. The glycolysis depolymerization is basically continued until the entire solid PET is dissolved in the glycol. This depolymerization operation yields monomer and low molecular weight oligomers. Mostly, this depolymerization process yields BHET (approximately 90% based on the weight of monomer) from the colored polyester.

Sometimes bottle flake contains polyvinyl chloride (PVC) from PVC containers or from the material used to make a cap for a soft drink bottle. Under PET glycolysis conditions PVC is known to decompose. PVC does not melt, but rather increases in mass (swells). The PVC chip component continues to swell initially for about three hours during glycolysis, thus, the PVC chip component can easily be removed or separated from the glycolyzed monomer by simple filtration. However, it is undesirable to wait much beyond about three hours to prevent substantial decomposition of the PVC chip component which results in chloride containing species being released into the glycolyzed monomer and an inability to remove the PVC chip component from the monomer before contamination of the monomer by chloride containing species. If the glycolysis temperature is less than about 240° C., then the optimal swelling time will increase.

After the colored PET has been depolymerized in a glycolysis process, and any PVC, or other contaminants, present have been filtered, the monomer may then be contacted with an activated carbon bed. The activated carbon bed removes certain dyes. For example, for certain green bottles, it removes the blue dye. While the size of the carbon bed may be varied, those skilled in the art would roughly employ about an equal weight of activated carbon in the bed as the weight of the colored polyester to be treated in one hour. The monomer (the glycolysis product) may be fed to the activated carbon bed via nitrogen pressure or by using a pump as shown in FIG. 1. The activated carbon column is maintained at a temperature of at least about 170° C.

Although any source of activated carbon would be suitable for the present invention, applicant has found that coconut shell activated carbon does a suitable job and is relative inexpensive compared to other sources of activated carbon. The coconut shell activated carbon pellets range in size from approximately 2 millimeters to 5 millimeters. Other sizes and shapes of activated carbon are also effective, such as flake form or granular form.

Depending on the frequency of use, the activated carbon column is back-washed with low-pressure steam (e.g. 50 psig) to remove glycolyzed material as well as dyes held by the activated carbon. The activated carbon bed could also be cleaned by pumping hot ethylene glycol (>150° C.) through the column. The ethylene glycol would carry any monomer out of the column through the overhead system. Once the monomer was removed, the ethylene glycol could be drained from the bottom of the column and the cleaning process would be complete. After regeneration by any of these two methods the carbon beds can be reused to absorb more dye from the colored glycolyzed monomer stream, thereby allowing a continuous process to be defined.

The activated carbon bed will also remove the yellow dyes, however, the capacity for removing the yellow dyes is very small (granular carbon being less than powdered carbon). Thus, the glycolyzed green product that was passed through the activated carbon bed had yellow dye therein. Occasionally, it was observed that black carbon particles also were entrained in the glycolyzed product that had been passed through the activated carbon bed. Accordingly, a filter could be employed to remove the activated carbon particles.

The yellow dye, in the case of green bottles, or any like colored dyes, which were not removed from the activated carbon bed can now be removed via an extraction process. Depending on the dye remaining in the glycolyzed product (substantially BHET monomer), the extraction solvent can be an alcohol such as methanol, or a glycol such as ethylene glycol. Water may also be employed as the extraction solvent, however, the extractability of the yellow dyes into water is less than into an alcohol or a glycol. The glycolyzed product from the activated carbon is introduced to an agitated (stirred) reactor containing the appropriate solvent, which is substantially cooler. The BHET immediately precipitates in the cooler solvent while the dye transfers into the solvent. For example, in green flake bottles, the activated carbon bed had previously removed the blue dye. The extraction process, employing either water or glycol, such as ethylene glycol, works suitably well because the yellow dye was soluble in either. However, methanol was more efficient in its extraction of the yellow dye from the glycolyzed product. Once the BHET precipitated out, and the dye transfers into the solvent, separation by filtration, centrifuging, or decanting can separate the precipitated glycolysis product from the solvent containing dye. The BHET/alcohol slurry has the consistency of yogurt and some separation methods are more suitable than others. For example, membrane plate filter presses, which allow for efficient solvent washes are preferable over centrifuges. Belt filtration can also be employed for separating the solid phase from the liquid phase solvent containing dye because belt filtration allows for cake washing. A decanting method also works well, for example, the BHET/alcohol mixture forms a stable slurry. However, if the slurry is added drop-wise into, for example, a vessel containing methanol, the slurry disperses in the methanol and the BHET drops and collects as a compressed bed on the bottom of the vessel. Thus the dye is separated from the compressed BHET and diluted in the methanol phase. Additional stages of separation can be added by feeding the solid BHET from the vessel to another vessel containing more methanol. The methanol can be added in a counter-current fashion to the slurry addition, and thereby allow for the movement of the methanol containing the yellow dyes to be opposite to the movement of the BHET. The BHET from the final stage contains methanol ranging from 8:1 to 22:1 weight ratio of MeOH:BHET, depending on the time the BHET is allowed to separate with the methanol phase. The solvent may be separated from the BHET by distillation, for example. The solvent may be recycled after distillation to the stirred reactor.

Once the solid BHET monomer is separated from the solvent, the BHET may be polymerized in a PET polymerization process, well known to those skilled in the art.

The process of the present invention is more easily understood by referring to FIG. 1, wherein a hopper 10 is employed to contain the scrap or flake post-consumer colored polyester. Storage tank 12 is for storing glycol such as ethylene glycol. The polyester scrap or flake from hopper 10 is introduced into reactor 14 via line 16. Glycol from storage tank 12 is introduced into reactor 14 via line 18. Within reactor 14 a glycolysis reaction occurs wherein the glycol reacts with the polyester and depolymerizes it into mostly monomer (BHET) and a small amount of oligomers. This glycolysis product from reactor 14 is pumped via pump 20, through line 22 to a carbon bed 24. The carbon bed 24 adsorbs certain dyes from the glycolysis product in line 22. Periodically the carbon bed is shut down and countercurrently steamed by the introduction of steam through line 26 to remove the adsorbed dark colorant through exit line 28.

Once the glycolysis product has traversed through the carbon bed 24, it exits through line 30 to an extractor tank 32. The extractor tank 32 includes an agitator 34 well known in the art. Solvent such as water, alcohol or glycol, enters the extractor tank 32 through line 36. The agitator 34 uniformly mixes the glycolysis product entering through line 30 with the solvent entering through line 36. The solvent is no warmer than room temperature while the glycolysis product in line 30 is about 150° C. to about 200° C. When the glycolysis product is contacted by the cool solvent, the monomer, including the small amount of oligomer immediately precipitates out.

Upon uniformly mixing the solvent with the glycolyzed product, the precipitate and solvent are drained through line 38 to a separator 40. The separator 40 may be a filter, a decanting apparatus, or a centrifuge. It separates the solid phase from the liquid solvent phase. The solid phase exits through line 42 and is substantially the BHET monomer. The liquid phase is substantially the solvent and any dyes, which exit through line 44 and flow to a distillation column 46. The distillation column 46 separates the solvent from the dye, which exits through line 48. The solvent exits column 46 through line 36, for recycle back to the extractor 32.

Optionally, if the source of PET contains PVC flake or other contaminants, then the glycolyzed product in line 22 flows through a filter 21, which filters the gelled (swollen) PVC and the other contaminants. The gelled PVC then exits through line 23 from the filter 21. After the glycolyzed product in line 22 is filtered via filter 21, it is then pumped into the carbon bed 24.

The following examples illustrate the process steps of the present invention.

EXAMPLE 1

Several batches of glycolysis product were prepared by glycolyzing (dissolving) green bottle flake according to the ratio of 10:7 wt PET:wt EG at a temperature greater than 200° C. The glycolysis product was then pumped through a carbon bed prepared by adding 1500 grams of coconut shell carbon pellets having a diameter between 2.4 and 5.0 mm, to a 316 stainless steel pipe 2" internal diameter and 4' long. The carbon bed was maintained at a temperature above 170° C. The green glycolyzed bottle flake was pumped through the column at a rate of about 20 ml per minute. The product was removed overhead of the column and had a yellow tint. All traces of blue colorant were absent. The glycolysis product was fed through the column continuously over the course of an eight-hour day, then shut down and drained. The next day the column was reheated and the glycolysis feed restarted. This procedure was repeated without the column being regenerated until the blue dyes were removed from a total of 102 kg of glycolysis product. The yellow tinted glycolysis product (ca. 150° C.) was then added with stirring to room temperature methanol at the weight ratio of 1:3 glycolysis product:methanol. This slurry was allowed to cool to approximately 30° C. The separation of BHET from the methanol mother liquor was done using a membrane plate filter press (470×470 mm plate size). The filter cloth was previously coated with diatomaceous earth (approximately ¼-inch thich) to inhibit blinding of the filtration surface. Once the slurry was charged to the filter chamber, the press mechanism was engaged and the mother liquor was squeezed through the filter cloth. The cake was washed in the chamber with fresh methanol to wash out more of the yellow dye, and the procedure for pressing out the methanol was repeated. The resultant cake containing 37% total solids was removed from the press chambers. Visible spectroscopic analysis (Spectronic Genesys 5 spectometer, 10 cm path length) of the methanol coming out of the press during the wash step was used to follow how well the color was being removed and the results set forth in Table 1.

TABLE 1

| Time elapsed during methanol wash step, minutes | Relative Absorbance at 430 nm |
|---|---|
| 5 | 1.35 |
| 10 | 0.63 |
| 15 | 0.50 |
| 22 | 0.40 |
| 29 | 0.36 |

The removal of the yellow dyes is a function of the amount of methanol that is used in the wash step. Obviously, there is an economic trade-off in methanol usage verses yellowness removal which must be considered. The material balance for this example resulted in 13 weight equivalents of methanol used per weight equivalent of BHET treated.

EXAMPLE 2

Figure 3:
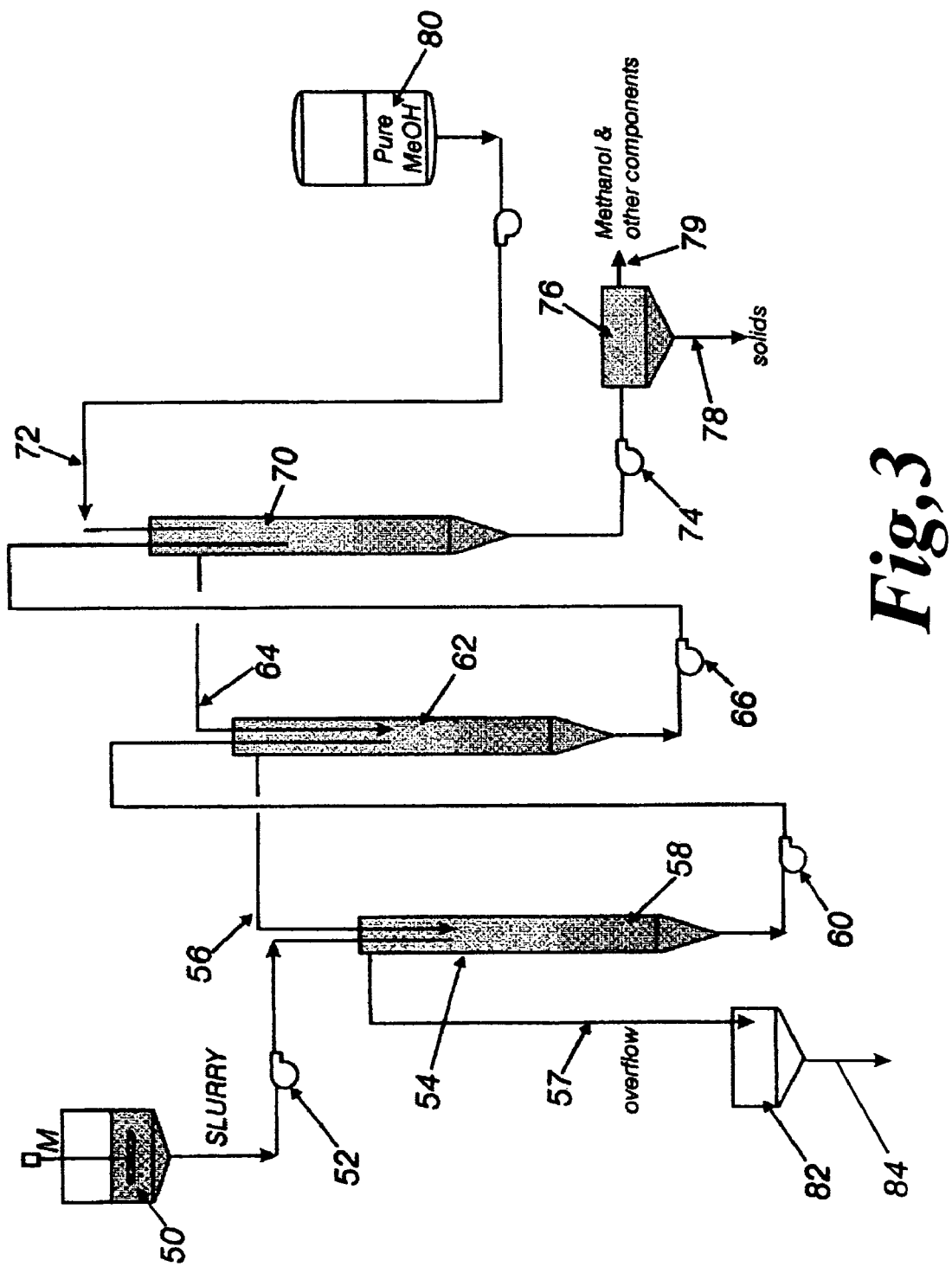
FIG. 3 illustrates the process layout for decanting the resin.

A counter-current extraction method was also used to separate the BHET from the methanolic mother liquor of Example 1. The slurry from Example 1 is diluted with recycle methanol such that the slurry contains a weight ratio of 11:1 methanol:BHET. As illustrated in FIG. 3, this slurry 50 is pumped 52 into the first vessel 54, which is filled with methanol via line 56, and there the BHET 58 settles (as a concentrated suspension) to the bottom of the vessel. This concentrated suspension of solid BHET is then pumped 60 through the top of the second vessel 62 where it mixes with more methanol 64 and settles to the bottom of the second vessel in a yet more concentrated suspension. This new concentrated suspension of solid BHET is then pumped 66 into a third vessel 70 where it mixes with more methanol 72 and settles to the final concentrated suspension. This final concentrated suspension of solid BHET is pumped 74 into a solids receiver 76 where the final settled suspension of solid BHET in methanol 78 is furthered concentrated and separated from and remaining methanol and other components 79. The methanol runs counter current to the BHET. Fresh methanol 80 is fed through the top of the third vessel 70. Overflow of methanol from line 64 feeds the second vessel 62, and then overflow line 56 of the second vessel feeds the first vessel 54. The overflow from vessel 54 is collected in tank 82 which contains the highest concentration of removed dyestuffs by this process, and the exit stream 84 can be separated from the dye and then recycled for further use. The idea is that the methanol becomes more contaminated with yellow dye as it moves right to left in viewing FIG. 3, and the suspended solid becomes whiter as it moves left to right. A typical material balance for this example consists of 19 parts methanol used per part BHET treated. The starting slurry was prepared using recycle methanol which had either gone overhead through line 57 from the first vessel 54 (yellowest color), or separated in line 79 from the solids 78 in the solids receiver 76 (lightest color). Since this methanol is mixed with the slurry in an internal recycle loop, it does not have to be distilled and therefore high dilution in the slurry is possible without affecting the economics of the process. However, this is a dilution process, i.e., the more fresh methanol used the whiter will be the product color. Also, the more compact the suspended solids are in the decant vessels the less methanol (and less yellow dye) will be in the solid. The final suspended solids receiver 76 should be large to maximize the settling time which will mean less methanol and other components in the solids product.

A 24-hour settling time in tank 76 resulted in a MeOH:BHET weight ratio of the settled suspension of 8:1 (stream 78). Evaporation of the methanol resulted in a solid BHET product with b* value (yellowness) of 6 compared to 16 for the starting glycolysis product separated from the mother liquor in vessel 32 (FIG. 1). It is possible to incorporate more than three decant vessels thus increasing stages of separation for even better color removal.

EXAMPLE 3

This example is given to show that under PET glycolysis conditions, PVC, which is found as a contaminant with PET post consumer bottle flake, swells and can be filtered away from the glycolysis product.

Green PET bottle flake was glycolyzed according to Example 1, and excess EG was allowed to distill overhead of the glycolysis vessel until the temperature of the glycolysis mixture reached 240° C. A wire mesh basket containing a known amount of PVC was immersed into the glycolysis vessel. Periodically the basket was removed and the contents washed with hot acetone, then weighed. After weighing, the basket was returned to the hot glycolysis mixture.

Figure 2:
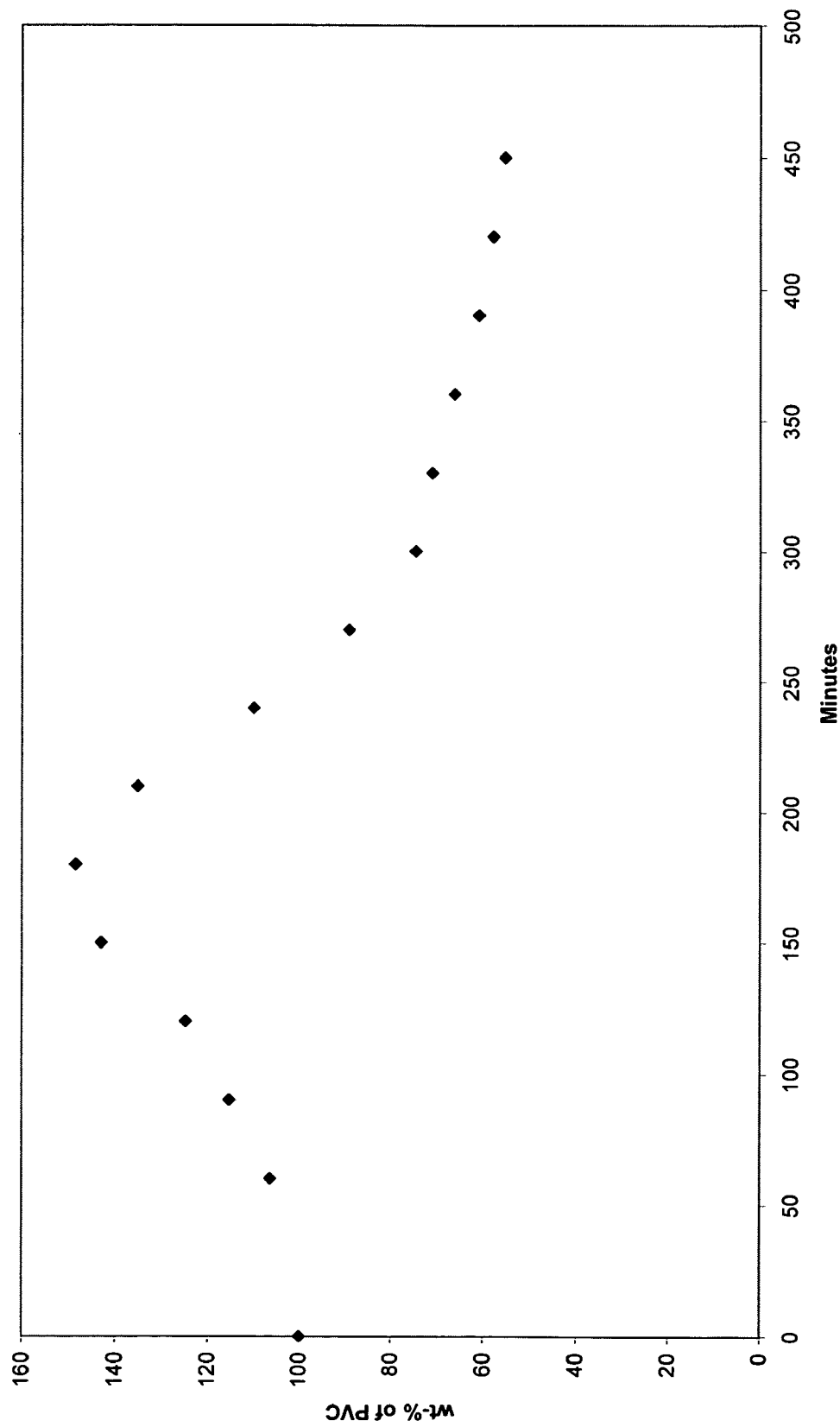
FIG. 2 is a graph of weight percent of PVC vs. time in minutes.

As is shown in FIG. 2, the mass of the PVC in the basket (expressed as a percentage of the original mass added) increased due to swelling under glycolysis conditions. After approximately three to three and a half hours, the PVC had swelled to its maximum value and then began decreasing in weight as the rate of decomposition surpassed the rate of swelling. This example shows that even though PVC decomposes (breaks down), it initially swells and can be filtered away from the liquid glycolysis product.

EXAMPLE 4

In order to obtain an estimate of the capacity required for the carbon bed, over 100 kg of glycolyzed product (58 kg of green flake and 44 kg of glycol) was passed through a 1.5 kg activated carbon bed without saturating the carbon bed with the blue colorants found in green bottle flake. Thus it is clear the carbon bed has a large capacity for the dyes tested of about a weight ratio of at least 40:1 flake to activated carbon Thus it is apparent that there has been provided, in accordance with the invention, a process that fully satisfied the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A method for removing colorants from colored polyester waste wherein the method comprises the following sequential steps:
   a. depolymerizing said colored polyester by adding a glycol to said polyester at a temperature in the range of from 180° C. to 280° C. for a period of from one to five hours to produce a glycolyzed monomer;
   b. optionally filtering specific contaminants from said glycolyzed monomer;
   c. feeding said glycolyzed monomer through a bed of activated carbon to remove some colorant;

d. extracting the remaining colorant from said glycolyzed monomer by introducing said glycolyzed monomer to a stirred reactor along with an extraction solvent at a temperature that is below the temperature of the glycolyzed monomer, said extraction solvent being selected from water, methanol, or a glycol whereby the glycolyzed monomer precipitates out and the remaining colorant transfers to the extraction solvent; and e. separating said glycolyzed monomer from the extraction solvent.

2. The method of claim 1, wherein said glycol of step (a) is ethylene glycol.

3. The method of claim 1, wherein said polyester includes polymer contaminants that swell in glycol, and said glycolyzed monomer of step (a) is filtered to remove said swellable polymer contaminants.

4. The method of claim 3, wherein said filtering occurs within about 3 hours of adding glycol to said polyester.

5. The method of claim 1, wherein said bed of activated carbon is maintained at a temperature that is greater than about 170° C.

6. The method of claim 1, wherein the weight of said activated carbon in step (c) is at least about the same weight of said glycolyzed monomer.

7. The method of claim 1, wherein said glycolyzed monomer is filtered after step c, to remove any impurities.

8. The method of claim 1, wherein the weight of said extraction solvent in step (d) is at least twice the weight of said glycolyzed monomer.

9. The method of claim 8, wherein the extraction solvent in step (d) is methanol and the glycolyzed monomer is decanted from said methanol.

10. The method of claim 1, wherein said separated glycolyzed monomer is polymerized to produce clear polyester polymer.

11. The method of claim 1, wherein said colored polyester is green.

12. The method of claim 1, wherein separating said glycolyzed monomer from the extraction solvent is accomplished by at least one of filtering, centrifuging, and decanting.

13. The method of claim 1, wherein said glycolyzed monomer is bis-hydroxyethyl terephthalate.

* * * * *